(12) United States Patent
Alva et al.

(10) Patent No.: US 7,114,015 B2
(45) Date of Patent: Sep. 26, 2006

(54) MEMORY CARD HAVING FIRST MODULAR COMPONENT WITH HOST INTERFACE WHEREIN THE FIRST MODULAR IS REPLACEABLE WITH A SECOND MODULAR COMPONENT HAVING SECOND HOST INTERFACE

(75) Inventors: Mauricio Huerta Alva, Boise, ID (US); Robin Alexis Takasugi, Eagle, ID (US); Tracy Ann Sauerwein, Boise, ID (US); Ladawan Johnson, Los Angeles, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 497 days.

(21) Appl. No.: 10/653,756

(22) Filed: Sep. 3, 2003

(65) Prior Publication Data

US 2005/0060464 A1    Mar. 17, 2005

(51) Int. Cl.
*G06F 3/00* (2006.01)
*G06F 11/00* (2006.01)
*G06F 13/00* (2006.01)
*G06F 13/10* (2006.01)

(52) U.S. Cl. .................... 710/38; 710/102; 710/13; 710/33; 710/8; 710/10; 710/62; 710/300; 714/7; 711/2; 711/115

(58) Field of Classification Search .............. 710/8, 710/10, 13, 33, 38, 62, 102, 300; 714/7; 711/2, 115
See application file for complete search history.

(56) References Cited

U.S. PATENT DOCUMENTS

| 6,182,162 | B1 | | 1/2001 | Estakhri et al. |
| 6,353,870 | B1 | | 3/2002 | Mills et al. |
| 6,385,677 | B1 | * | 5/2002 | Yao .............................. 711/115 |
| 6,438,638 | B1 | | 8/2002 | Jones et al. |
| 6,741,934 | B1 | * | 5/2004 | Chen et al. ................. 701/213 |
| 6,776,348 | B1 | * | 8/2004 | Liu et al. ..................... 235/492 |
| 6,817,531 | B1 | * | 11/2004 | Taussig et al. .............. 235/492 |
| 6,842,335 | B1 | * | 1/2005 | Hanson et al. .............. 361/683 |
| 6,980,465 | B1 | * | 12/2005 | Taussig et al. .............. 365/158 |
| 6,984,152 | B1 | * | 1/2006 | Mowery et al. ............ 439/638 |
| 6,993,601 | B1 | * | 1/2006 | Minami et al. ............... 710/38 |
| 2004/0030820 | A1 | * | 2/2004 | Lan ............................. 710/300 |
| 2004/0180692 | A1 | * | 9/2004 | Yang et al. .................. 455/557 |
| 2005/0078195 | A1 | * | 4/2005 | VanWagner ............... 348/231.3 |
| 2005/0268162 | A1 | * | 12/2005 | Milligan et al. ................ 714/7 |

FOREIGN PATENT DOCUMENTS

| EP | 0929043 A1 | 7/1999 |
| EP | 1049325 | * 11/2000 |
| EP | 1146428 A1 | 10/2001 |

* cited by examiner

*Primary Examiner*—Tammara Peyton
(74) *Attorney, Agent, or Firm*—Kirk A. Cesari; David K. Lucente

(57) ABSTRACT

A memory card comprising a first modular component that comprises a first host interface and a first host interface module and a device interface module configured to operate a device interface that is coupled to a storage device. The first host interface module is configured to call a function in the device interface module. The first modular component is replaceable with a second modular component that comprises a second host interface and a second host interface module, and the second host interface module is configured to call the function in the device interface module.

12 Claims, 6 Drawing Sheets

MEMORY CARD HAVING FIRST MODULAR COMPONENT WITH HOST INTERFACE WHEREIN THE FIRST MODULAR IS REPLACEABLE WITH A SECOND MODULAR COMPONENT HAVING SECOND HOST INTERFACE

CROSS-REFERENCE TO RELATED APPLICATIONS

This patent application is related to Non-Provisional U.S. patent application Ser. No. 10/654,135, entitled "MEMORY CARD WITH A MODULAR COMPONENT", filed on even date herewith, assigned to the assignee of the present invention, and incorporated herein by reference.

BACKGROUND OF THE INVENTION

The need for portability and ease in capturing and saving information from various locations away from a user's office or work has resulted in a proliferation of portable electronic devices, such as digital cameras, personal digital assistants, and notebook computers. With the proliferation of portable electronic devices, the use of form factor cards adapted for use with these devices is steadily increasing as well, and the uncertainty of the portable electronic device market has also spilled over to the form factor card market.

The uncertainty of the form factor card market has resulted in several form factor card standards jockeying to become the dominant standard. The term "form factor card" is a general term often used to describe a memory card employing a variety of different standards, such as a SONY Memory Stick or Compact Flash card, but also applies to cards that perform other functions, including I/O cards such as serial cards, Ethernet cards, fax/modem cards, wireless pagers, and multimedia cards. Unfortunately, since none of the existing or emerging card standards are able to meet 100% of customer needs, a dominant standard has not emerged and is unlikely to emerge in the foreseeable future.

Consequently, a memory card manufacturer is forced to supply separate memory cards that accommodate the myriad of existing and emerging memory card technologies. If a memory card manufacturer wants to compete in the market, the memory card manufacturer must take into account all of the different memory card standards, which include both device interface standards and storage technology standards. For example, if there are N interfaces in the market and M different storage technologies, then the memory card manufacturer may design N times M memory cards employing different control systems to offer a full portfolio of memory cards and compete in the memory card market. This results in significant delays and could require many months to specify, design, verify, fabricate, and test the memory card before it may be brought to market. For example, a typical design period may encompass 18 months.

A need exists for a manufacturer to be able to leverage the development of memory cards by allowing the most efficient use of resources and accelerating time to market without increasing the cost of producing a memory card.

SUMMARY OF THE INVENTION

One exemplary embodiment of the present disclosure provides a memory card comprising a first modular component that comprises a first host interface and a first host interface module and a device interface module configured to operate a device interface that is coupled to a storage device. The first host interface module is configured to call a function in the device interface module. The first modular component is replaceable with a second modular component that comprises a second host interface and a second host interface module, and the second host interface module is configured to call the function in the device interface module.

BRIEF DESCRIPTION OF THE DRAWINGS

Embodiments of the invention are better understood with reference to the following drawings. The elements of the drawings are not necessarily to scale relative to each other. Like reference numerals designate corresponding similar parts.

DETAILED DESCRIPTION

Figure 1:
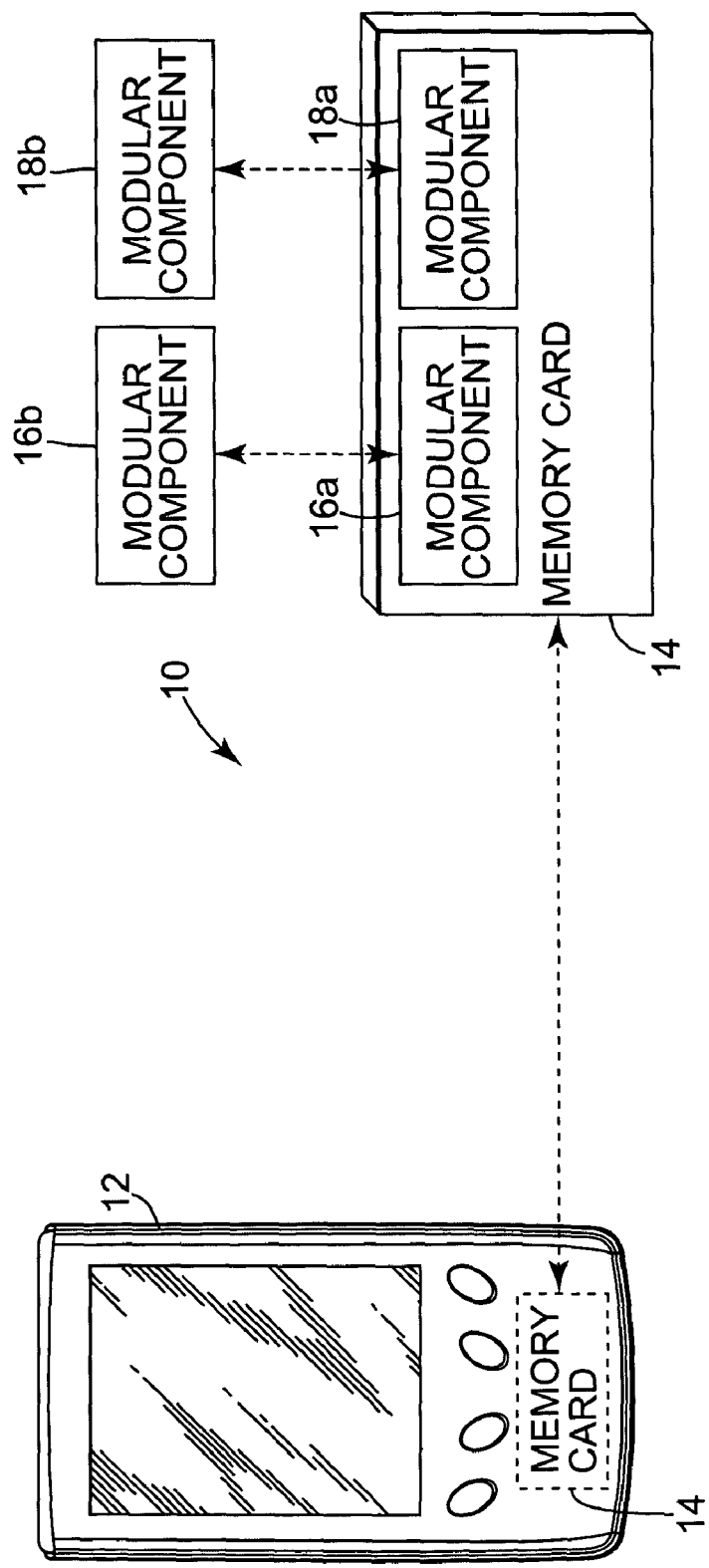
FIG. 1 is a diagram illustrating an embodiment of a computing system.

FIG. 1 is a diagram illustrating an embodiment of a computing system 10. Computing system 10 includes a host electronic device 12 and a memory, which is preferably a removable memory card 14 that plugs in to computing system 10. Memory card 14 includes modular components 16a and 18a.

Host 12 communicates with memory card 14 to read information from and write information to memory card 14. Host 12 may be any device that utilizes memory card 14. For example, host 12 may be a digital camera, an MP3 player, a digital camcorder, a personal digital assistant, a laptop, a notebook computer, or another computing device. In one embodiment, host 12 is a personal digital assistant or "PDA".

Each modular component 16a and 18a is configured according to one or more interface standards. The interface standards include host-to-memory card interface standards such as CompactFlash as set forth by the CompactFlash Specification Version 2.0 and any prior or subsequent versions, Secure Digital as set forth by the SD Memory Card Specifications Version 1.01 and any prior or subsequent versions, PCMCIA as set forth by the PC Card Standard 8.0 and any prior or subsequent versions, and Memory Stick according to specifications implemented by Sony Electronics Corporation, and data storage device interface standards such as an interfaces to magnetic random access memory (MRAM) and flash memory.

The CompactFlash Specification Version 2.0 may be available from the CompactFlash Association, P.O. Box 51537, Palo Alto, Calif. 94303. The SD Memory Card Specifications Version 1.01 may be available from the SD Card Association, 719 San Benito Street, Suite C, Hollister, Calif. 95023. The PC Card Standard 8.0 is available from PCMCIA, 2635 North First Street, Suite 209, San Jose, Calif. 95134. Memory Stick specifications may be available from Sony Electronics Corporation.

The interface specifications define the mechanical, electrical, and/or protocol attributes of an interface between two or more components. Modular components 16a and 18a are each configured such that they are replaceable by another modular component 16b and 18b, respectively. Modular components 16b and 18b are configured according to different interface standards than modular components 16a and 16b.

Figure 2:
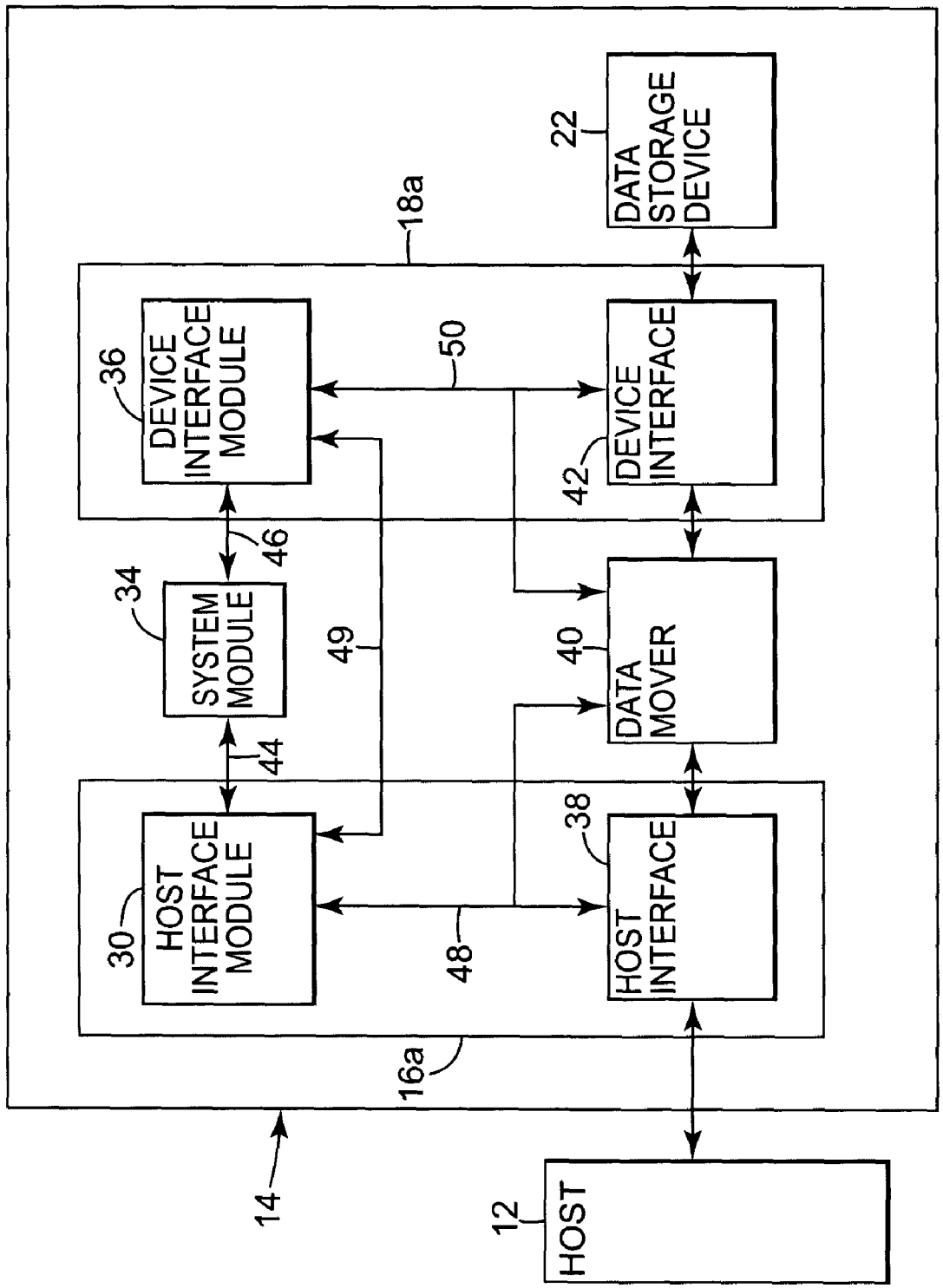
FIG. 2 is a block diagram illustrating an embodiment of a data storage system with modular components.

FIG. 2 is a block diagram illustrating an embodiment of a memory card 14 in communication with host electronic device 12. In the embodiment shown in FIG. 2, memory card 14 includes modular components 16a and 18a, a data mover 40, a data storage device 22, and a system module 34. Modular component 16a includes a host interface 38 and a host interface module 30. Modular component 18a includes a device interface 42 and a device interface module 36.

Data storage device 22 comprises a non-volatile memory. Non-volatile memories include flash memory, magnetic random access memory (MRAM), and other persistent storage device such as a micro disk drive.

Host interface module 30, system module 34, and device interface module 36 each comprise firmware that includes instructions configured to perform the functions described herein. The instructions are readable from one or more storage devices (not shown) and executable by one or more processors in memory card 14 (not shown).

System module 34, host interface module 30, and device interface module 36 each include discrete functions according to a defined interface. System module 34 includes functions that call other functions in host interface module 30 and device interface module 36 as indicated by arrows 44 and 46, respectively. System module 34 also includes functions for managing and controlling the overall operation of memory card 14. Host interface module 30 includes functions that control host interface 38 and portions of data mover 40 as indicated by an arrow 48. Host interface module 30 also includes functions that call functions in system module 34 and device interface module 36 as indicated by arrows 44 and 49, respectively. Device interface module 36 includes functions that control device interface 42 and portions of data mover 40 as indicated by an arrow 50. Device interface module 36 also includes functions that may call other functions in system module 34 and host interface module 30 as indicated by arrows 46 and 49, respectively.

In the embodiment of FIG. 2, modular component 16a is configured to implement a first type of interface between host 12 and memory card 14, and modular component 18a is configured to implement an interface to a first type of data storage device 22, e.g. MRAM. The discrete nature of the functions in system module 34, host interface module 30, and device interface module 36 allow modular components 16a and 18a to be replaced with modular components 16b and 18b, respectively, which implement other types of interfaces.

In particular, host interface 38 and host interface module 30 of modular component 16a may be replaced with another host interface and host interface module in modular component 16b that implements a second type of interface between host 12 and memory card 14. Modular component 16b provides the same functional interface, i.e. the ability to call the same functions, to system module 34 and device interface module 36 as modular component 16a. In addition, modular component 16b is configured to call the same functions in system module 34 and device interface module 36 as modular component 16a.

Similarly, device interface 42 and device interface module 36 of modular component 18a may be replaced with another device interface and device interface module in modular component 18b that implements an interface to a second type of data storage device 22, e.g. flash memory. Modular component 18b provides the same functional interface, i.e. the ability to call the same functions, to system module 34 and host interface module 30 as modular component 118a. In addition, modular component 18b is configured to call the same functions in system module 34 and host interface module 30 as modular component 18a.

Host interface module 30 effectively hides the details of host interface 38 from system module 34 and device interface module 36 by using hardware abstraction layers. Similarly, device interface module 36 effectively hides the details of device interface 42 from system module 34 and host interface module 38 by using hardware abstraction layers.

System module 34 manages the transfer of information between host 12 and data storage device 22. Host electronic device 12 communicates with memory card 14 by providing commands to host interface 38. System module 34 detects commands received by host interface 38 and calls functions in host interface module 30 and/or device interface module 36 associated with the commands. In addition, system module 34 performs diagnostic, power management, and clock control functions.

Figure 3:
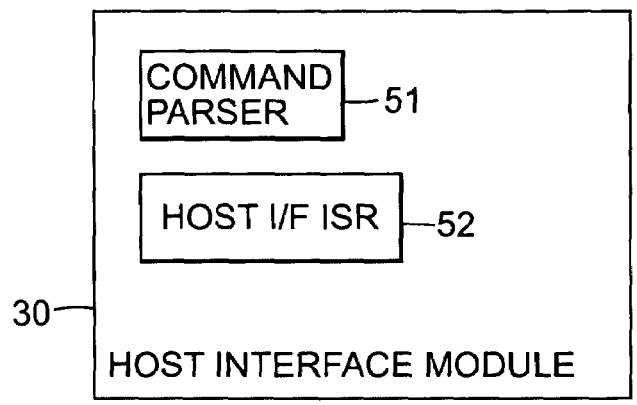
FIG. 3 is a block diagram illustrating an embodiment of a host interface module.

FIG. 3 illustrates details of an embodiment of the host interface module 30. The host interface module 30 includes a command parser 51 and a host interface (I/F) interrupt service routine (ISR) 52. The host I/F ISR 52 is configured to cause interrupts to be generated in response to certain events such as receiving a command from host 12. Command parser 51 is configured to cause "parse" or separate out the commands received from host 12 to cause appropriate functions in host interface module 30 and device interface module 36 to be called and executed.

Host interface module 30 operates according to a host interface protocol to communicate with host electronic device 12. Host interface module 30 interface protocols include CompactFlash, Secure Digital, Memory Stick, and other suitable host interface protocols.

In one embodiment, host interface module 30 operates as a CompactFlash interface meeting the CF+ and CompactFlash Specification Version 2.0 as set forth by the CompactFlash Association. The CF+ and CompactFlash Specification Version 2.0 are incorporated by reference herein. Host interface module 30 initiates data transfers, operates in supported CompactFlash modes (e.g., PC card memory, PC Card I/O and true IDE), maintains contents of a Card Information Structure (CIS) RAM, manages configuration parameters, and receives and executes CompactFlash ATA commands via the command parser 51.

Figure 4:
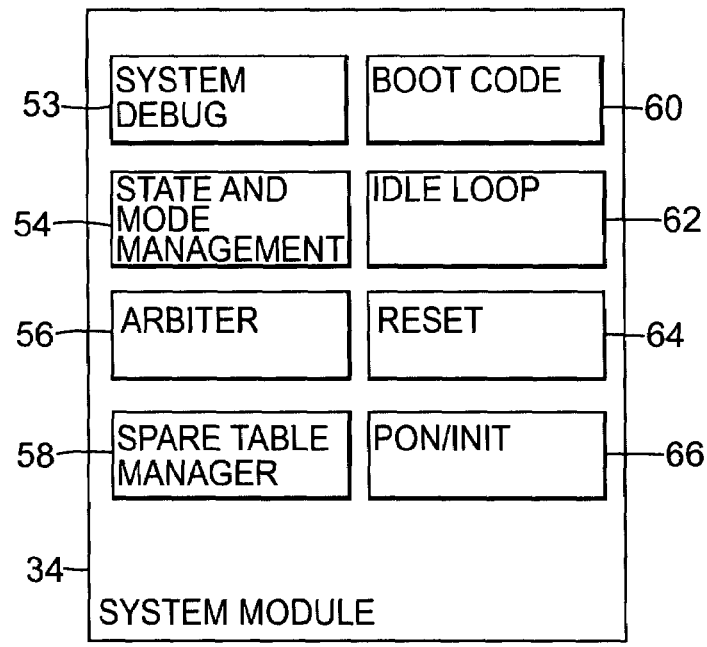
FIG. 4 is a block diagram illustrating an embodiment of a system controller.

FIG. 4 illustrates an embodiment of system module 34. System module 34 includes a system debug module 53, a state and mode management module 54, an arbiter module 56, a spare table manager module 58, a boot code module 60, an idle loop module 62, a reset module 64 and a power on/initialization (PON/INIT) module 66.

Figure 5:
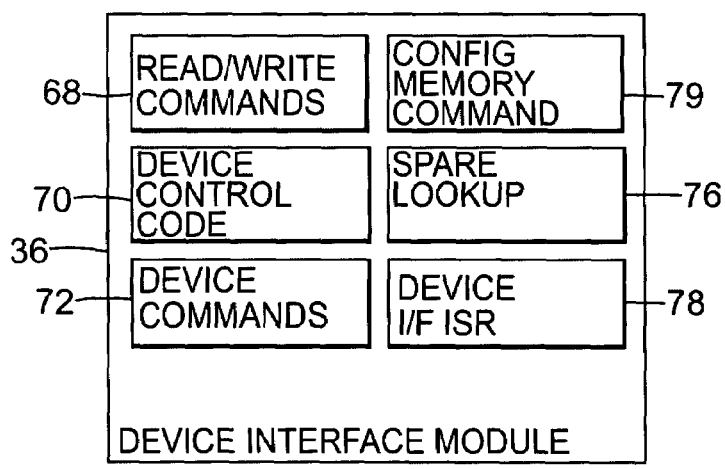
FIG. 5 is a block diagram illustrating an embodiment of a device interface module.

FIG. 5 illustrates an embodiment of device interface module 36. Device interface module 36 includes a read/write commands module 68, a device control code module 70, a device commands module 72, a configure memory command module 74, a spare lookup module 76, and a device interface (I/F) interrupt service routine (ISR) module 78.

Device interface module 36 configures device interface 42 for data transfers between data mover 40 and data storage device 22. Device interface module 36 may also perform error detection and correction and may implement sparing algorithms to improve storage efficiency of data storage device 22.

In one aspect, host interface module 30 acts as a master module relative to device interface module 36 by communicating with host 12 via host interface 38 and initiating all command executions when host interface 38 receives the host specific command from host 12. Thus, device interface module 36 acts as a slave to host interface module 30 by responding to the host commands received from host 12 via host interface module 30. Device interface module 36 includes detailed knowledge of the technology used by data storage device 22.

In one embodiment, host 12 read and write commands are based on logical block addressing. In one embodiment, device interface module 36 checks all sectors in data storage device 22 via spare lookup 76 to see if data requested by host 12 has been relocated on data storage system 22. In one aspect, device interface module 36 uses sparing tables to look up a logical block address included in the operation request and determine a physical sector address of any sector of data storage device 22. Device interface module 36 also communicates its state of execution of commands (e.g., busy, idle, etc.) to host interface module 30.

Figure 6A:
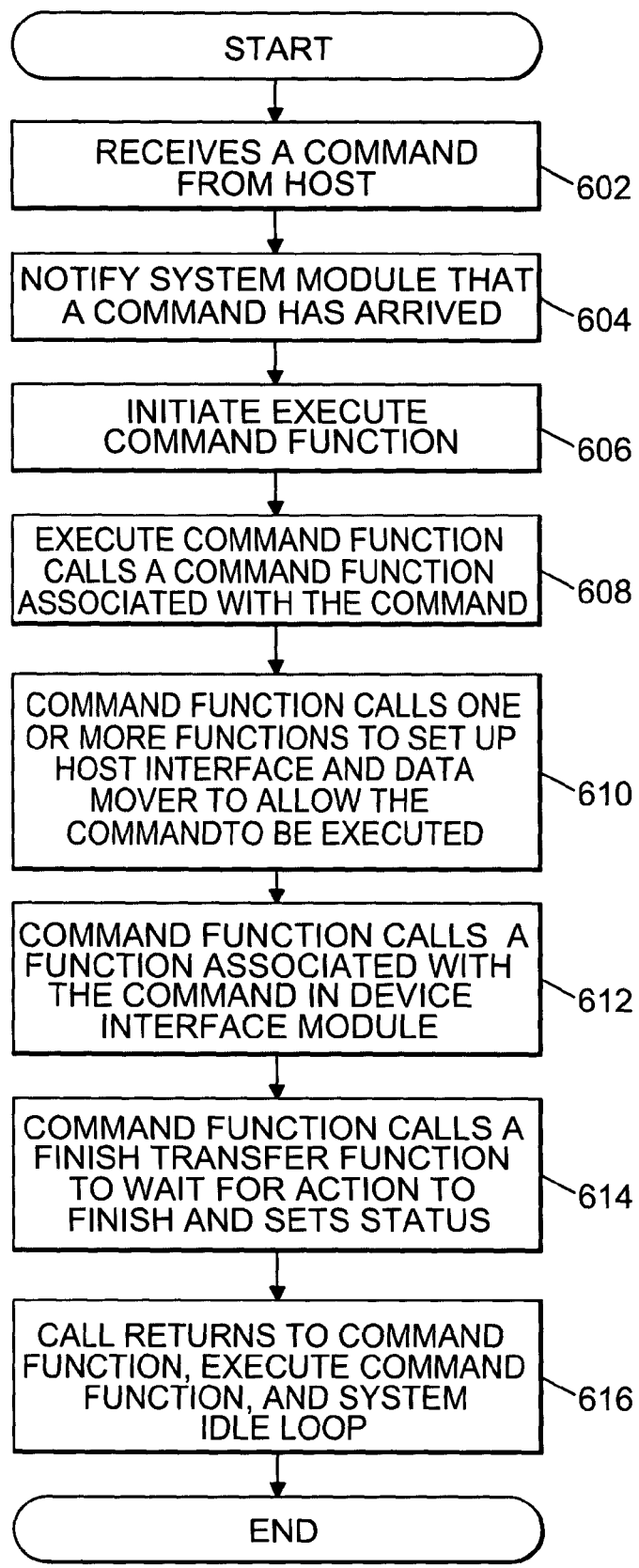
FIG. 6a is a flow chart illustrating an embodiment of a method performed by a host interface module.
Figure 6B:
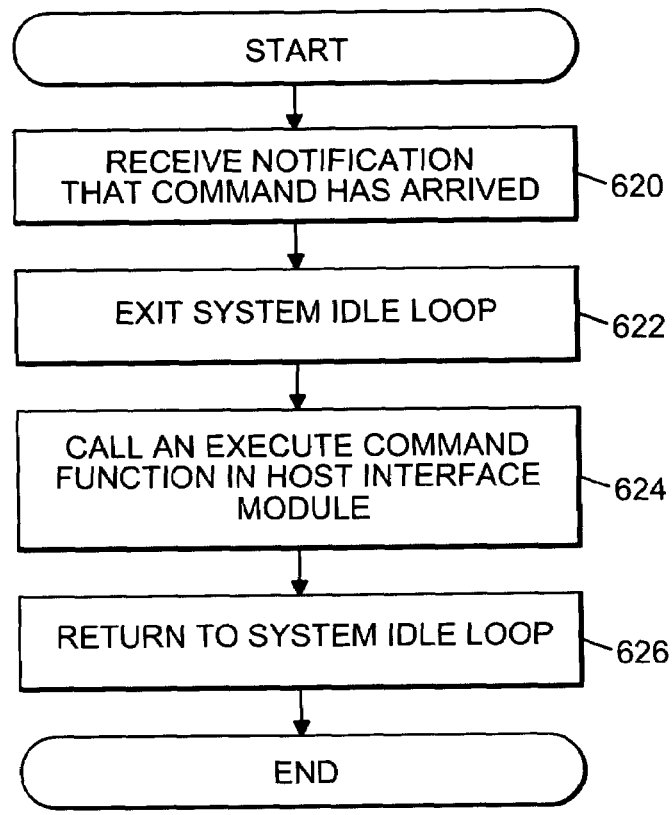
FIG. 6b is a flow chart illustrating an embodiment of a method performed by a system module.
Figure 6C:
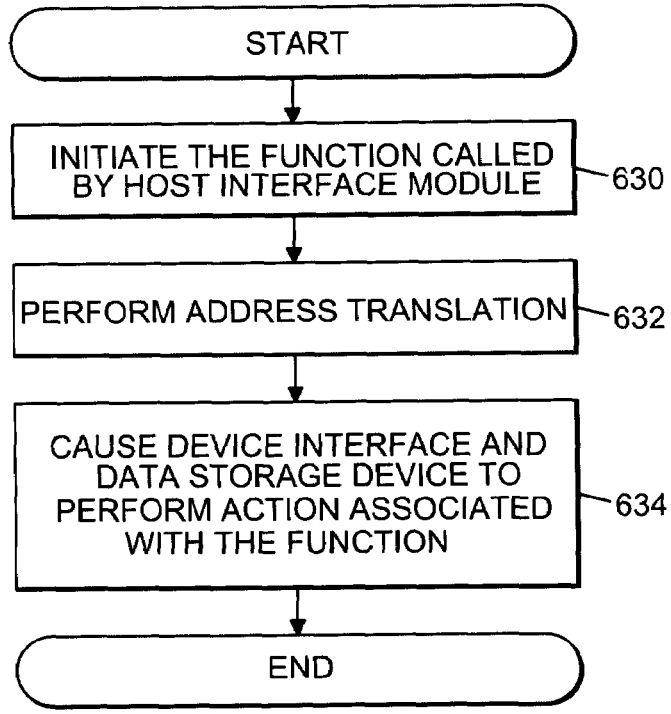
FIG. 6c is a flow chart illustrating an embodiment of a method performed by a device interface module.

FIGS. 6a, 6b, and 6c are flow charts illustrating a method for executing a command in a memory card with modular components. The method will be described with reference to the embodiment shown in FIG. 2. In particular, FIG. 6a illustrates an embodiment of a method performed by host interface module 30, FIG. 6b illustrates an embodiment of a method performed by a system module 34, and FIG. 6c illustrates an embodiment of a method performed by device interface module 36.

Referring to FIG. 6a, host interface module 30 receives a command from host 12 as indicated in a block 602. In response to receiving the command, host interface module 30 notifies system module 34 that a command has arrived as indicated in a block 604. In one embodiment, host interface module 30 sets a flag to notify system module 34 that a command has arrived. System module 34 periodically checks the flag to determine whether a command has been received by host interface 38. In other embodiments, host interface module 30 provides another signal or indication to system module 34 to notify system module 34 that a command has arrived.

Referring to FIG. 6b, system module 34 receives the notification from host interface module 30 as indicated in a block 620. In response to receiving the notification, system module 34 exits a system idle loop as indicated in a block 622 and calls an execute command function in host interface module 30 as indicated in a block 624.

Referring back to FIG. 6a, host interface module 30 initiates the execute command function in response to the function call from system module 34 as indicated in a block 606. The execute command function identifies the command received by host interface 38 and calls a command function associated with the command within host interface module 30 as indicated in a block 608. If, for example, the command is a read command, then the command function is a function configured to cause a read from data storage device 22 to occur, e.g., a function labeled "ReadSectors". Similarly, if the command is a write command, then the command function is a function configured to cause a write to data storage device 22 to occur, e.g., a function labeled "WriteSectors".

The command function calls one or more functions in host interface module 30 to set up host interface 38 and data mover 40 to allow the command to be executed as indicated in a block 610. The functions to set up host interface 38 and data mover 40 may depend on the command to be executed. For a read command, data mover 40 is set up to receive information from data storage device 22 over device interface 42, and host interface 38 is set up to provide information from data storage device 22 to host 12. For a write command, host interface 38 is set up to receive information from host 12, and data mover 40 is set up to provide information from host interface 38 to device interface 42.

The command function also calls a function associated with the command in device interface module 36. For example, the command function may call a function labeled "StartRead" if the command is a read. Similarly, the command function may call a function labeled "StartWrite" if the command is a write. The command function passes parameters from host interface module 30 to device interface module 36 by calling the function in device interface module 36. The parameters for read and write commands include an address in the form of a logical block address and a size of the data transfer.

Referring to FIG. 6c, device interface module 36 initiates the function called by host interface module 30 in response to receiving the function call as indicated in a block 630. Device interface module 36 performs address translation on the logical block address received as a parameter of the function to convert the logical block address to a physical block address as indicated in a block 632.

Device interface module 36 causes the device interface 42 and data storage device 22 to perform an action associated with the function as indicated in a block 634. The action depends on the command provided by host 12. For example, if the command is a read, device interface module 36 causes the device interface 42 to receive information from data storage device 22 from the physical block address and provide the information to data mover 40. Data mover 40 then provides the information to host 12 over host interface 38. If the command is a write, device interface module 36 causes the device interface 42 to provide information to data storage device 22 from data mover 40 and store the information at the physical block address.

Device interface module 36 and/or device interface 42 may also perform error detection and correction and/or sparing algorithms on information read from data storage device 22. Device interface module 36 and/or device interface 42 may further add ECC parity bytes to information written to data storage device 22. Because device interface module 36 and device interface 42 are closely linked to data storage device 22, these additional operations are performed without being visible to host 12, host interface module 30 and system module 34 and the operations may be specific to the type of data storage device 22.

Referring back to FIG. 6a, the command function of the host interface module 30 calls a finish transfer function to wait for the action initiated by device interface module 36 to finish and to set status information as indicated in a block 614. After the action completes, host interface 38 provides the status information to host 12. Call returns, i.e. instructions that cause the called function to be exited and control to be returned to the calling function, from the finish transfer function to the command function, from the command function to the execute command function, and from the executed command function to the system idle loop are performed as indicated in a block 616.

Referring to FIG. 6*b*, system module 34 returns to the system idle loop in response to the call return from the execute command function of host interface module 30 as indicated in a block 626.

In one embodiment, host interface module 30 can cause a read or write command to be stopped in response to an abort command from host 12 by calling an abort function in device interface module 36. In response to executing the abort function, device interface module 36 causes any current operation on data storage device 22 to be stopped using device interface 42 and causes status information to be sent back to host interface module 30.

Figure 7:
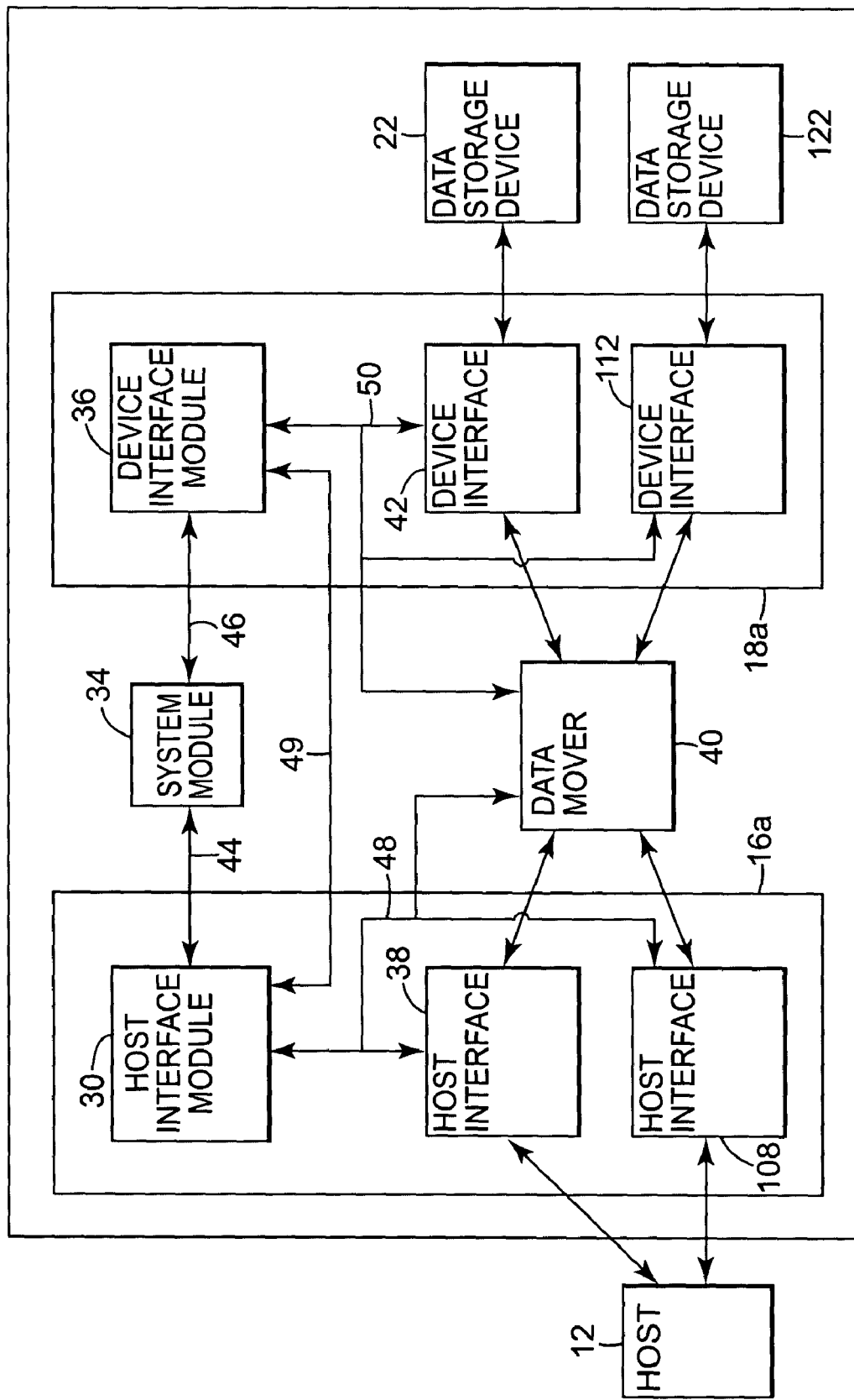
FIG. 7 is a block diagram illustrating an alternative embodiment of a memory card with modular components.

FIG. 7 is a block diagram illustrating an alternative embodiment of 14 memory card with modular components 16*a* and 18*a*. In the embodiment of FIG. 7, modular component 16*a* includes an additional host interface 108, and modular component 18*a* includes an additional device interface 112. Device interface 112 interfaces with a data storage device 122.

As illustrated in FIG. 7, modular components 16*a* and 18*a* may each include multiple types of interfaces, e.g. a CompactFlash interface and a Secure Digital interface. Host 12 may communicate with memory card 14 using either host interface 38 or host interface 108. In one embodiment, host interface module 30 is configured to operate host interface 38 and host interface 108. In other embodiments, host interface module 30 may operate host interface 38 and another host interface module (not shown) may be included to operate host interface 108.

With device interfaces 42 and 112, memory card 14 is configured to include two different types of data storage devices 22 and 122, e.g. an MRAM storage device and a flash memory storage device. In one embodiment, device interface module 36 is configured to operate data storage device 22 and data storage device 122. In other embodiments, device interface module 30 may operate data storage device 22 and another device interface module (not shown) may be included to operate data storage device 122.

In one embodiment, only one of data storage devices 22 and 122 is present in memory card 14. For example, the least expensive of data storage devices 22 and 122 may be included. In other embodiments, memory card 14 may include both data storage devices 22 and 122 to utilize advantages of different types of storage devices.

What is claimed is:

1. An apparatus comprising:
    a memory card having:
        a first modular component that comprises a first host interface and a first host interface module; and
        a device interface module configured to operate a device interface that is coupled to a storage device;
    wherein the first host interface module is configured to call a function in the device interface module, wherein the first modular component is replaceable with a second modular component that comprises a second host interface and a second host interface module, and wherein the second host interface module is configured to call the function in the device interface module.

2. The apparatus of claim 1 wherein the first modular component is associated with a first type of interface, and wherein the second modular component is associated with a second type of interface.

3. The apparatus of claim 1 wherein the first host interface module is configured to call the function in the device interface module in response to receiving a first command from a first host coupled to the first host interface.

4. The apparatus of claim 3 wherein the second host interface module is configured to call the function in the device interface module in response to receiving a second command from a second host coupled to the second host interface.

5. The apparatus of claim 3 wherein the first command comprises a read command.

6. The apparatus of claim 3 wherein the first command comprises a write command.

7. An apparatus comprising:
    a memory card having:
        a first modular component that comprises a first device interface and a first device interface module; and
        a host interface module configured to operate a host interface that is coupled to a host;
    wherein the first device interface module is configured cause a first function to be executed in response to receiving a function call from the host interface module, wherein the first modular component is replaceable with a second modular component that comprises a second device interface and a second device interface module, and wherein the second device interface module is configured to cause a second function to be executed in response to receiving the function call from the host interface module.

8. The apparatus of claim 7 wherein the first modular component is associated with a first type of storage device, and wherein the second modular component is associated with a second type of storage device.

9. The apparatus of claim 7 wherein the host interface module is configured to call the first function in the first device interface module in response to receiving a first command from the host.

10. The apparatus of claim 9 wherein the host interface module is configured to call the second function in the second device interface module in response to receiving a second command from the host.

11. The apparatus of claim 9 wherein the first command comprises a read command.

12. The apparatus of claim 9 wherein the first command comprises a write command.

* * * * *